US009652293B2

(12) United States Patent
Kukreja

(10) Patent No.: US 9,652,293 B2
(45) Date of Patent: May 16, 2017

(54) SYSTEM AND METHOD FOR DYNAMIC CACHE DATA DECOMPRESSION IN A TRAFFIC DIRECTOR ENVIRONMENT

(71) Applicant: ORACLE INTERNATIONAL CORPORATION, Redwood Shores, CA (US)

(72) Inventor: Basant Kukreja, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/625,716

(22) Filed: Sep. 24, 2012

(65) Prior Publication Data

US 2013/0080566 A1 Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
G06F 15/167 (2006.01)
G06F 9/50 (2006.01)
(Continued)

(52) U.S. Cl.
CPC ............ *G06F 9/505* (2013.01); *G06F 9/4443* (2013.01); *G06F 9/45512* (2013.01);
(Continued)

(58) Field of Classification Search
USPC ................ 709/213, 230, 232, 235, 246, 247
See application file for complete search history.

(56) References Cited

U.S. PATENT DOCUMENTS 6,560,717 B1 5/2003 Scott
6,691,244 B1 2/2004 Kampe et al.
(Continued)

FOREIGN PATENT DOCUMENTS

CN 1251669 A 4/2000
CN 1444813 9/2003
(Continued)

OTHER PUBLICATIONS

Ken St. Cyr, "Load-Balance Ad LDS with Microsoft NLB in 6 Steps", Jun. 23, 2009, Windows IT Pro, all pages, "http://windowsitpro.com/article/network-load-balancing-nlb/load-balance-ad-lds-with-microsoft-nlb-in-6-steps-102360".*
(Continued)

*Primary Examiner* — Hua Fan
(74) *Attorney, Agent, or Firm* — Tucker Ellis LLP

(57) ABSTRACT

Described herein are systems and methods for use with a load balancer or traffic director, and administration thereof, wherein the traffic director is provided as a software-based load balancer that can be used to deliver a fast, reliable, scalable, and secure platform for load-balancing Internet and other traffic to back-end origin servers, such as web servers, application servers, or other resource servers. In accordance with an embodiment, the traffic director can be configured to compress data stored in its cache, and to respond to requests from clients by serving content from origin servers either as compressed data, or by dynamically decompressing the data before serving it, should a particular client prefer to receive a non-compressed variant of the data. In accordance with an embodiment, the traffic director can be configured to make use of hardware-assisted compression primitives, to further improve the performance of its data compression and decompression.

22 Claims, 7 Drawing Sheets

(51) Int. Cl.

| | | |
|---|---|---|
| *G06F 17/27* | (2006.01) | |
| *G06F 9/44* | (2006.01) | |
| *G06F 9/455* | (2006.01) | |
| *G06F 11/20* | (2006.01) | |
| *H04L 29/08* | (2006.01) | |
| *H04L 12/24* | (2006.01) | |
| *H04L 29/06* | (2006.01) | |

(52) U.S. Cl.
CPC ........ *G06F 11/2041* (2013.01); *G06F 17/276* (2013.01); *H04L 41/08* (2013.01); *H04L 63/0853* (2013.01); *H04L 67/1008* (2013.01)

(56) References Cited

U.S. PATENT DOCUMENTS

| | | | |
|---|---|---|---|
| 6,701,438 B1 | 3/2004 | Prabandham | |
| 6,727,926 B1 | 4/2004 | Utsuki | |
| 6,880,156 B1 | 4/2005 | Landherr | |
| 7,099,915 B1 | 8/2006 | Tenereillo | |
| 7,158,926 B2 | 1/2007 | Kampe | |
| 7,289,445 B2* | 10/2007 | Illikkal et al. | 370/235 |
| 7,321,926 B1 | 1/2008 | Zhang | |
| 7,370,083 B2 | 5/2008 | Husain et al. | |
| 7,395,355 B2* | 7/2008 | Afergan et al. | 709/247 |
| 7,437,549 B2 | 10/2008 | Lindqvist | |
| 7,616,625 B1* | 11/2009 | Un et al. | 370/353 |
| 7,619,545 B2* | 11/2009 | Samuels et al. | 341/51 |
| 7,664,948 B2 | 2/2010 | Moreau | |
| 7,849,368 B2 | 12/2010 | Srivastava | |
| 8,059,653 B1 | 11/2011 | Wang | |
| 8,230,336 B2 | 7/2012 | Morrill | |
| 8,260,757 B1 | 9/2012 | Chatterjee | |
| 8,693,981 B1 | 4/2014 | Anugu | |
| 2001/0049732 A1* | 12/2001 | Raciborski et al. | 709/224 |
| 2001/0049741 A1 | 12/2001 | Skene | |
| 2002/0055980 A1 | 5/2002 | Goddard | |
| 2002/0055982 A1 | 5/2002 | Goddard | |
| 2002/0087694 A1 | 7/2002 | Daoud | |
| 2002/0116397 A1 | 8/2002 | Berg | |
| 2002/0122388 A1* | 9/2002 | Behbehani | 370/238 |
| 2002/0143953 A1 | 10/2002 | Aiken | |
| 2002/0143965 A1 | 10/2002 | Aiken | |
| 2002/0152307 A1 | 10/2002 | Doyle et al. | |
| 2003/0023743 A1 | 1/2003 | Raphel | |
| 2003/0051055 A1 | 3/2003 | Parrella et al. | |
| 2003/0188013 A1 | 10/2003 | Nishikado | |
| 2003/0195940 A1* | 10/2003 | Basu et al. | 709/213 |
| 2004/0024853 A1 | 2/2004 | Cates | |
| 2004/0024861 A1 | 2/2004 | Coughlin | |
| 2004/0031030 A1 | 2/2004 | Kidder | |
| 2004/0049598 A1* | 3/2004 | Tucker et al. | 709/246 |
| 2004/0107273 A1 | 6/2004 | Biran | |
| 2004/0153558 A1 | 8/2004 | Gunduc | |
| 2004/0172470 A1 | 9/2004 | Shiina | |
| 2005/0086337 A1 | 4/2005 | Quittek | |
| 2005/0102400 A1 | 5/2005 | Nakahara | |
| 2005/0188295 A1 | 8/2005 | Konkus et al. | |
| 2005/0198247 A1 | 9/2005 | Perry | |
| 2005/0213507 A1 | 9/2005 | Banerjee | |
| 2005/0262183 A1 | 11/2005 | Colrain et al. | |
| 2006/0062177 A1* | 3/2006 | Asthana et al. | 370/328 |
| 2006/0085680 A1 | 4/2006 | Matsuno | |
| 2006/0190579 A1 | 8/2006 | Rachniowski et al. | |
| 2006/0294207 A1 | 12/2006 | Barsness | |
| 2007/0005801 A1 | 1/2007 | Kumar et al. | |
| 2007/0130341 A1 | 6/2007 | Ma | |
| 2007/0169049 A1 | 7/2007 | Gingell et al. | |
| 2007/0174660 A1 | 7/2007 | Peddada | |
| 2007/0226359 A1 | 9/2007 | Gunduc et al. | |
| 2007/0260702 A1 | 11/2007 | Richardson | |
| 2008/0046596 A1* | 2/2008 | Afergan et al. | 709/247 |
| 2008/0133536 A1 | 6/2008 | Bjorner et al. | |
| 2008/0228939 A1* | 9/2008 | Samuels et al. | 709/235 |
| 2009/0006541 A1 | 1/2009 | Baba | |
| 2009/0049161 A1 | 2/2009 | Takeuchi | |
| 2009/0077233 A1 | 3/2009 | Kurebayashi | |
| 2009/0204885 A1 | 8/2009 | Ellsworth et al. | |
| 2009/0245122 A1 | 10/2009 | Maiocco | |
| 2009/0259736 A1 | 10/2009 | Chang | |
| 2009/0328054 A1 | 12/2009 | Paramasivam et al. | |
| 2010/0030851 A1 | 2/2010 | Inden | |
| 2010/0036956 A1 | 2/2010 | Nishikawa | |
| 2010/0070561 A1 | 3/2010 | Dhoolia et al. | |
| 2010/0220740 A1 | 9/2010 | Hufferd | |
| 2010/0235484 A1 | 9/2010 | Bolan et al. | |
| 2011/0106949 A1 | 5/2011 | Patel | |
| 2011/0107136 A1 | 5/2011 | Jonnagadla et al. | |
| 2011/0122893 A1* | 5/2011 | Kang et al. | 370/477 |
| 2011/0145786 A1 | 6/2011 | Fayed et al. | |
| 2011/0161523 A1* | 6/2011 | Erickson et al. | 709/247 |
| 2011/0208808 A1* | 8/2011 | Corbett | 709/203 |
| 2011/0276695 A1 | 11/2011 | Maldaner | |
| 2012/0096166 A1 | 4/2012 | Devarapalli | |
| 2012/0271964 A1 | 10/2012 | Porter | |
| 2013/0054806 A1 | 2/2013 | Francis | |
| 2014/0089285 A1 | 3/2014 | Gibbs | |

FOREIGN PATENT DOCUMENTS

| | | |
|---|---|---|
| CN | 1285055 C | 11/2006 |
| CN | 101291253 | 10/2008 |
| CN | 101346972 A | 1/2009 |
| CN | 101755418 | 6/2010 |
| CN | 102077533 | 5/2011 |
| EP | 1134658 A2 | 9/2001 |
| GB | 2 360 369 A | 9/2001 |
| JP | S62139049 A | 6/1987 |
| JP | H09259095 A | 10/1997 |
| JP | H09330245 A | 12/1997 |
| JP | 2000099435 A | 4/2000 |
| JP | 2002163241 | 6/2002 |
| JP | 2004030204 | 1/2004 |
| JP | 2008027388 | 2/2008 |
| JP | 2008040718 | 2/2008 |
| JP | 2009193427 | 8/2009 |
| JP | 2010113495 | 5/2010 |
| JP | 2011186810 | 9/2011 |
| WO | 02/07037 | 1/2002 |
| WO | 03/105004 | 12/2003 |
| WO | 2004/008334 | 1/2004 |

OTHER PUBLICATIONS

International Searching Authority, International Search Report and Written Opinion for PCT International Application No. PCT/US2012/057373, Feb. 14, 2013, 13 pages.

International Searching Authority, International Search Report and Written Opinion for PCT International Application No. PCT/US2012/057370, May 31, 2013, 17 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

Wikipedia, HTTP Compression, pp. 1-2, http://en.wikipedia.org/w/index.php?title=HTTP_compression&oldid=450858133, Sep. 16, 2011.

Method and System for Displaying Graphical Objects in a Command Line Interface (CLI) Terminal, IP.com Journal, IP.com Inc., West Henrietta, NY, US, Feb. 18, 2010.

Elkstein, DR. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

Oracle International Corporation, Oracle Traffic Director, Administrators Guide, 11g Release, Aug. 2013, 312 pages.

Unknown Author, Health Checks Overview, Chapter 4, Health Checks, Jun. 2009, pp. 4-1-4-78.

(56) References Cited

OTHER PUBLICATIONS

State Intellectual Property Office of the People's Republic of China, Search Report for Chinese Patent Application No. 201280047085.8, Office Action dated Aug. 20, 2015, 2 pages.
State Intellectual Property Office of the People's Republic of China, Notification of First Office Action Dated Jun. 30, 2016 for Chinese Patent Application No. 201280047079.2, 10 Pages.
State Intellectual Property Office of the People's Republic of China, Notification of First Office Action Dated Jun. 23, 2016 for Chinese Patent Application No. 201280047076.9, 14 Pages.
State Intellectual Property Office of the People's Republic of China, Notification of First Office Action Dated Aug. 4, 2016 for Chinese Patent Application No. 201280047077.3, 12 Pages.

* cited by examiner

SYSTEM AND METHOD FOR DYNAMIC CACHE DATA DECOMPRESSION IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to a load balancer or traffic director, for use in an application server, middleware machine or other computing environment, and is particularly related to a system and method for providing dynamic cache data decompression in such an environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director can be configured to compress data stored in its cache, and to respond to requests from clients by serving content from origin servers either as compressed data, or by dynamically decompressing the data before serving it, should a particular client prefer to receive a non-compressed variant of the data. In accordance with an embodiment, the traffic director can be configured to make use of hardware-assisted compression primitives, to further improve the performance of its data compression and decompression.

DETAILED DESCRIPTION

Figure 1:
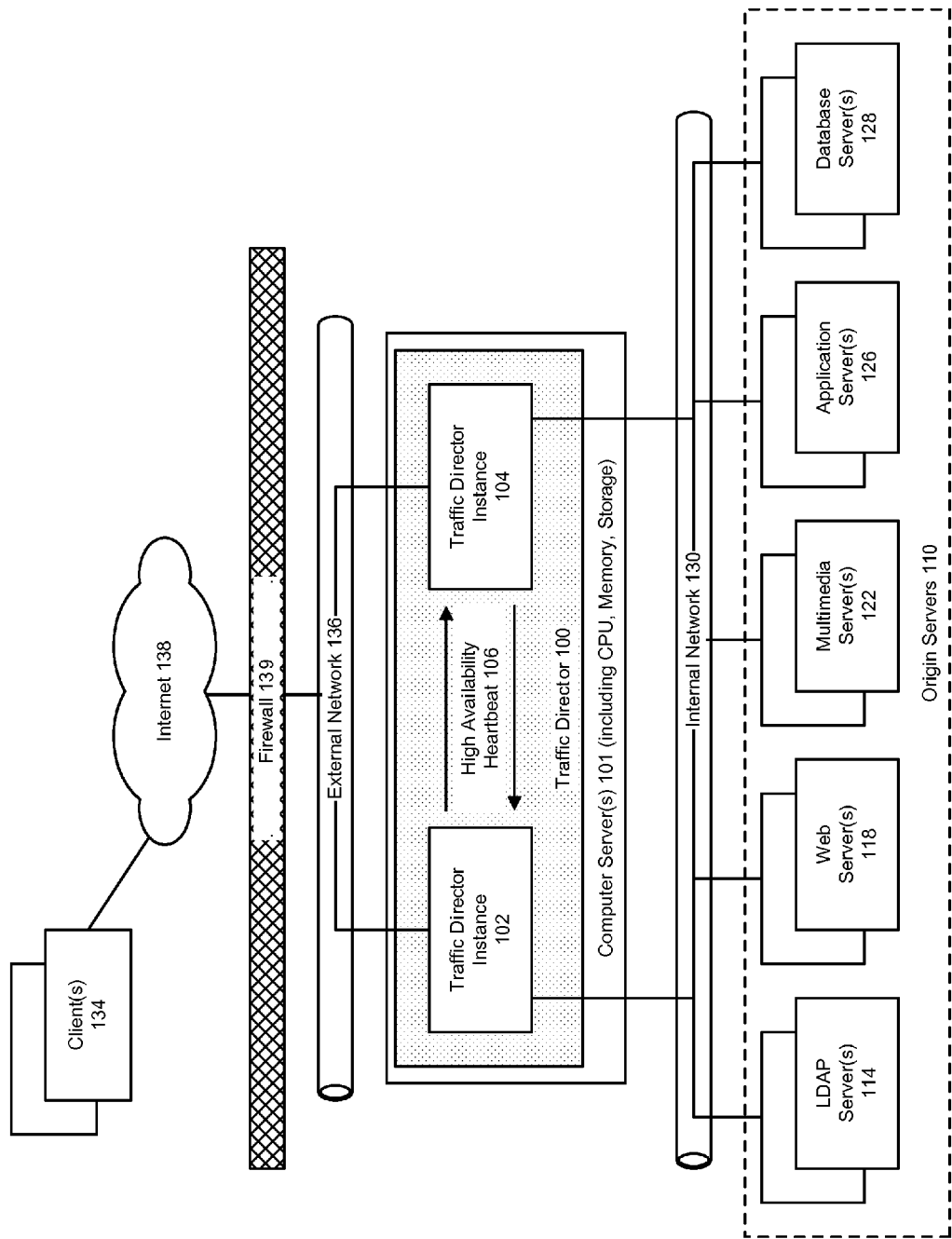
FIG. 1 illustrates a computing environment which includes a load balancer or traffic director, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

GLOSSARY

In accordance with an embodiment, the following terms are used herein. It will be evident that, in accordance with other embodiments, additional and/or different terms can be used.
Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.
Instance (Traffic Director Instance): A traffic director server that is instantiated from a configuration and deployed on an administration node or the administration server.
Cluster: A collection of two or more traffic director instances that are created from the same configuration.
Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.
Administration Server: A specially configured traffic director instance that hosts the interfaces, including administration console and command-line interface, through which an administrator can create traffic director configurations, deploy them as instances on administration nodes, and manage the instances.
Administration Node: A physical server that is designated as a host on which the administrator can deploy traffic director instances. In accordance with an embodiment, on a given node, the administrator can deploy only one instance of a configuration.
INSTANCE_HOME: A directory of the administrator's choice, on the administration server or an administration node, in which the configuration data and binary files pertaining to traffic director instances are stored.
ORACLE_HOME: A directory of the administrator's choice in which the administrator installs the traffic director binaries.
Administration Console: A web-based graphical interface on the administration server that the administrator can use to create, deploy, and manage traffic director instances.
Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.
Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.
Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
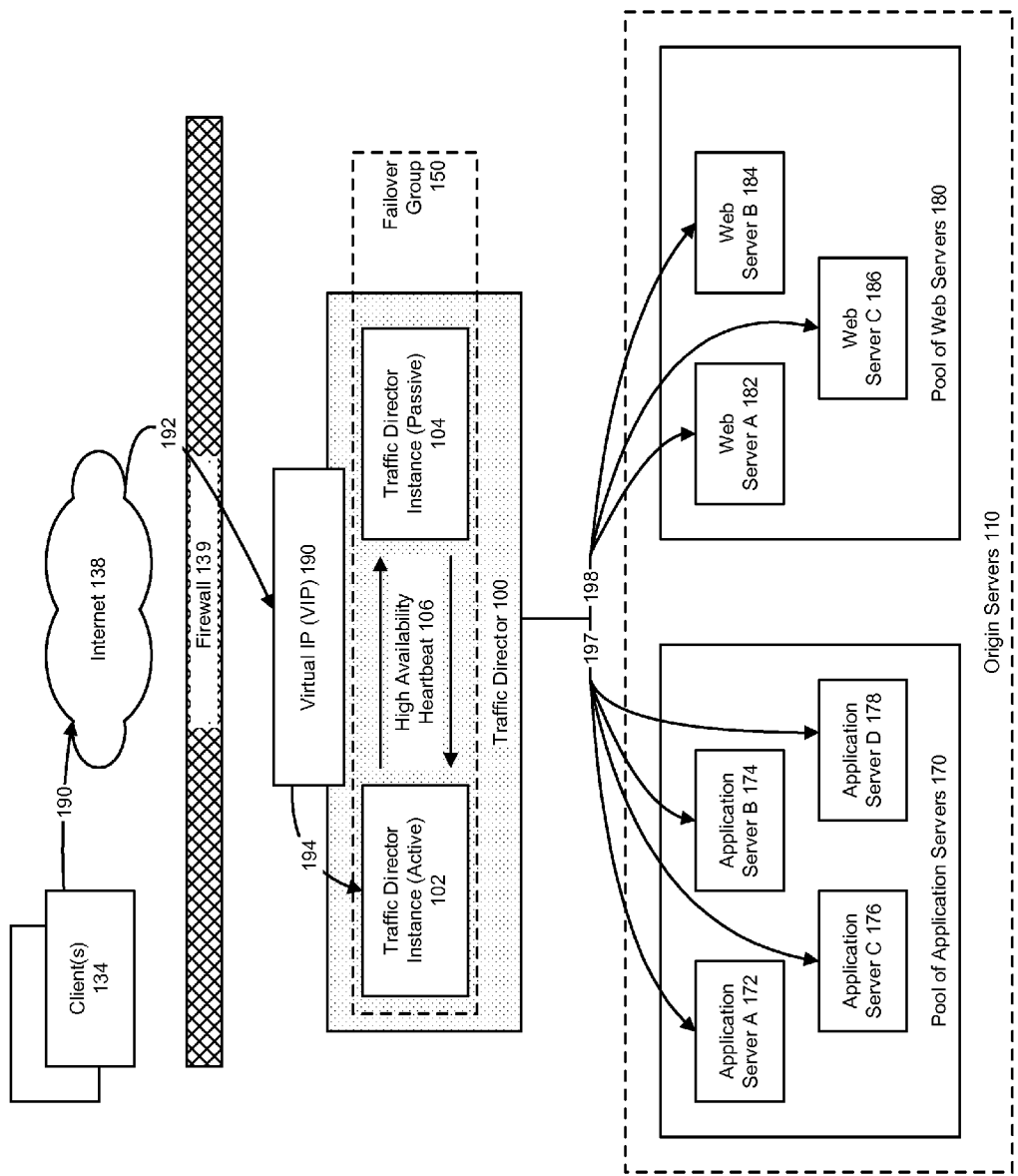
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C 186. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
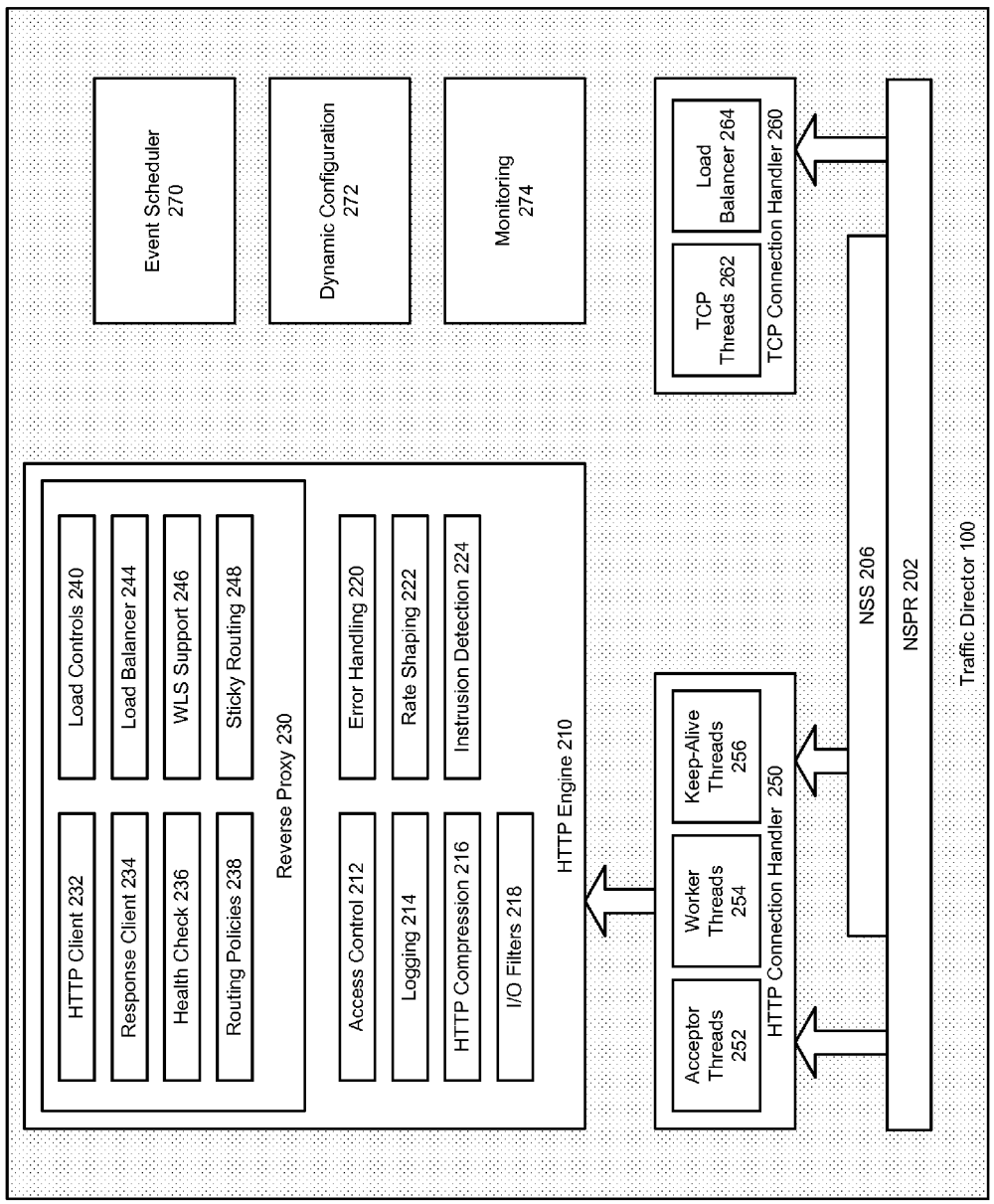
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more events schedule 270, dynamic configuration 272, monitoring 274, or other components.

It will be evident that, in accordance with other embodiments, additional and/or different components can be used.

Figure 4:
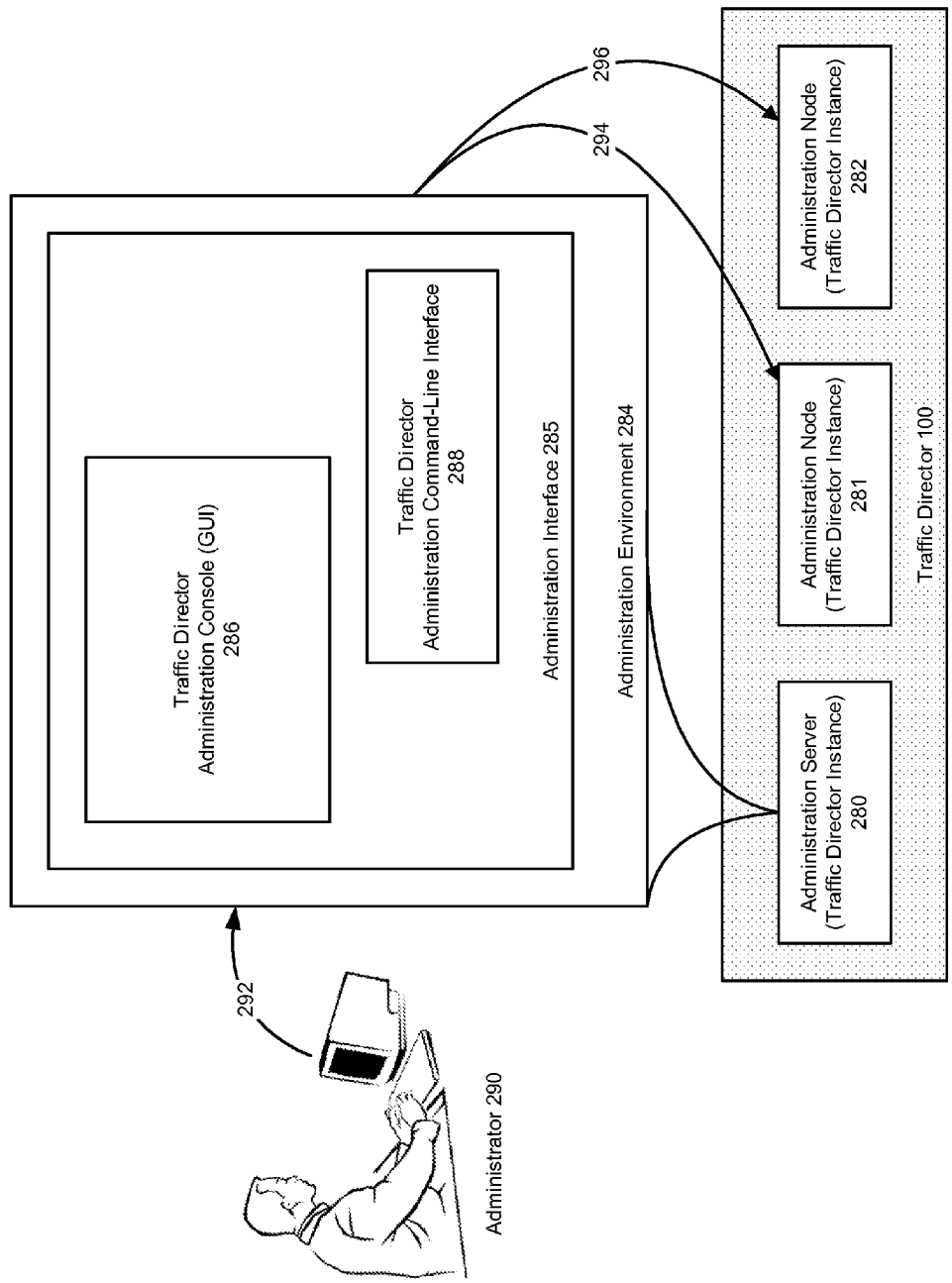
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Dynamic Cache Data Decompression

In accordance with an embodiment, the traffic director can be configured to respond to requests from clients by serving content from origin servers either as compressed data, or by dynamically decompressing the data before serving it, should a particular client prefer to receive a non-compressed variant of the data.

In accordance with an embodiment, the determination as to whether to serve data in either its compressed, or decompressed format, can be provided in the initial client request, e.g., through the use of HTTP headers, which provides flexibility and interoperability. The compression and decompression of such data can be configured to work together with the traffic director's built-in HTTP caching functionality.

Figure 5:
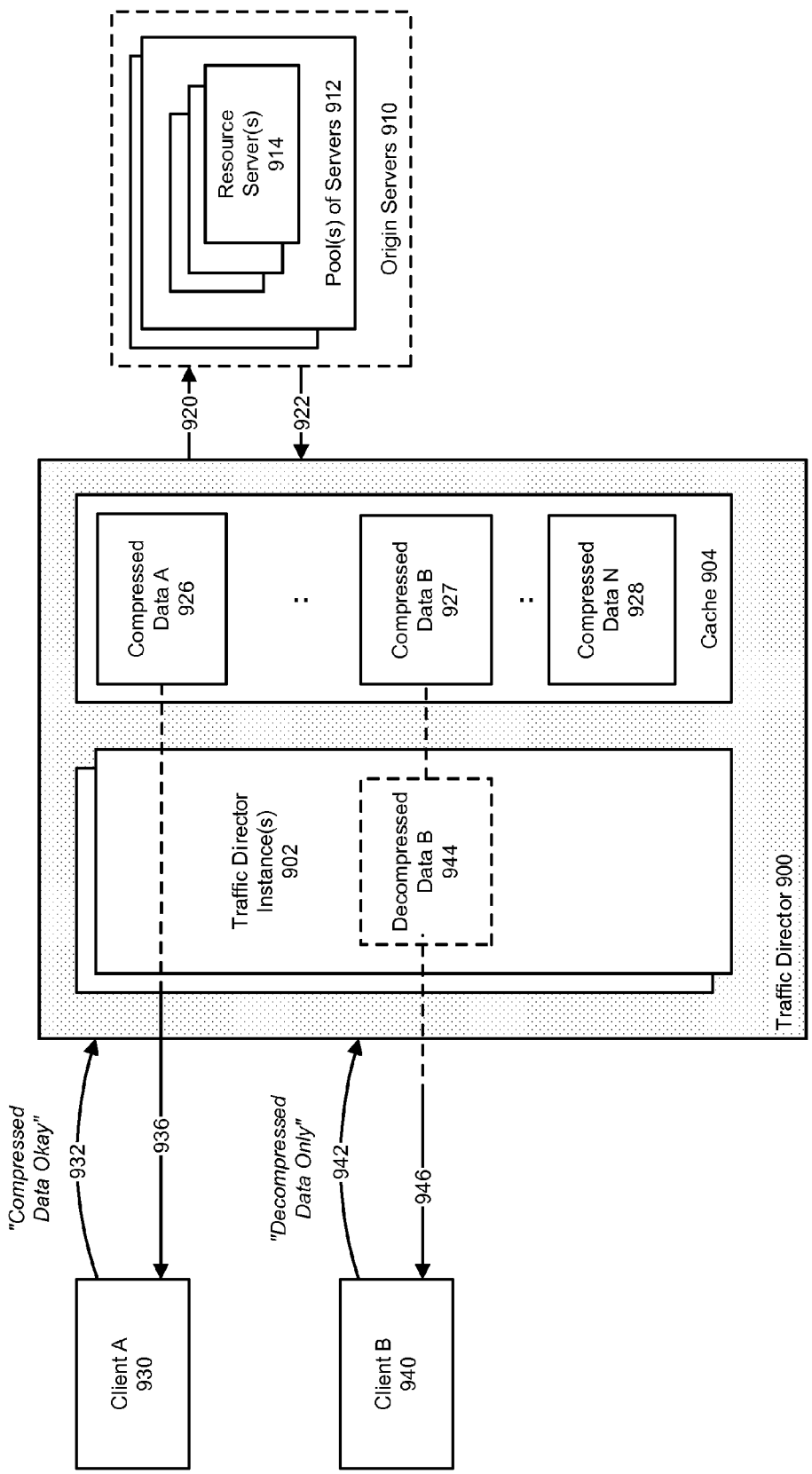
FIG. 5 illustrates the use of dynamic HTTP decompression in a traffic director environment, in accordance with an embodiment.

FIG. 5 illustrates the use of dynamic HTTP decompression in a traffic director environment, in accordance with an embodiment. As shown in FIG. 5, in accordance with an embodiment, the traffic director 900 can include one or more traffic director instances 902, for distributing client requests to origin servers 910, including one or more pools 912 of resource servers 914.

In accordance with an embodiment, the traffic director includes a cache 904, which can be enabled for use with one or more of the origin servers. Although shown in FIG. 5 as a single cache which is shared by several traffic director instances, in accordance with an embodiment several such caches can be used, and/or each traffic director instance can have its own cache.

In accordance with an embodiment, when caching is enabled, as client requests are communicated 920 to the origin servers, and content is returned 922 from those origin servers in response to the requests, the traffic director can cache one or more sets of data corresponding to origin server content, within its cache, according to its configuration. As an illustrative example, a particular origin server may be configured to serve image files (e.g. GIF files) and other content to clients, and the traffic director may be configured to cache the image files received from that particular origin server within its cache, for a particular period of time.

In accordance with an embodiment, the traffic director operates as an in-memory database, which means that caching data requires use of computer memory, and which in turn affects both system cost and performance. To address this, in accordance with an embodiment, the traffic director can compress the data to be stored in its cache, prior to caching the compressed data 926, 927, 928. This reduces the overall cache size required, and hence memory requirements and/or allows a greater number of data entries to be stored within a particular cache size.

In accordance with an embodiment, the cached data can then be provided to a client in response to a request from the client, either in its compressed format, or in a decompressed format, depending on the needs of the client.

For example, while some (e.g., browser) clients can accept compressed data within a response, other clients (e.g., mobile phones) may require response data to be provided in a non-compressed format.

As shown in FIG. 5, in accordance with an embodiment, a client A 930 can indicate to the traffic director that a response can include compressed data 932. In accordance with an embodiment, this indication can be communicated by the client to the traffic director as part of a request component (e.g., in the case of HTTP traffic, a HTTP request header). In response, the traffic director can either communicate the request to the origin server to obtain a response, or, if the traffic director determines that a copy of the data is currently stored within its cache, in a compressed format (e.g., compressed data A 926), it can return 936 that data, in the compressed format, to the client.

As further shown in FIG. 5, In accordance with an embodiment, a client B 940 can indicate to the traffic director that a response cannot include compressed data (i.e., that only non-compressed data is acceptable) 942. In accordance with an embodiment, this indication can be similarly communicated by the client to the traffic director as part of a request component, e.g., a HTTP request header. In response, the traffic director can again either communicate the request to the origin server to obtain a response, or, if the traffic director determines that a copy of the data is currently stored within its cache in a compressed format (e.g., compressed data B 927), decompress that data 944, and return the decompressed variant 946 of the data to the client.

Although illustrated in FIG. 5 as affirmative indications from a client, e.g., through the use of HTTP request headers, in accordance with an embodiment the system can also recognize defaults, e.g., that by default only non-compressed data should be considered acceptable to a client, unless a client indicates otherwise, and operate accordingly.

Using the above functionality, the cache need not store the data in two different (e.g., compressed versus non-compressed) formats, to suit the needs of different clients, but instead only a single compressed data instance/format need be stored within the cache, and the data decompressed as needed depending on the needs of the particular client making the request.

Figure 6:
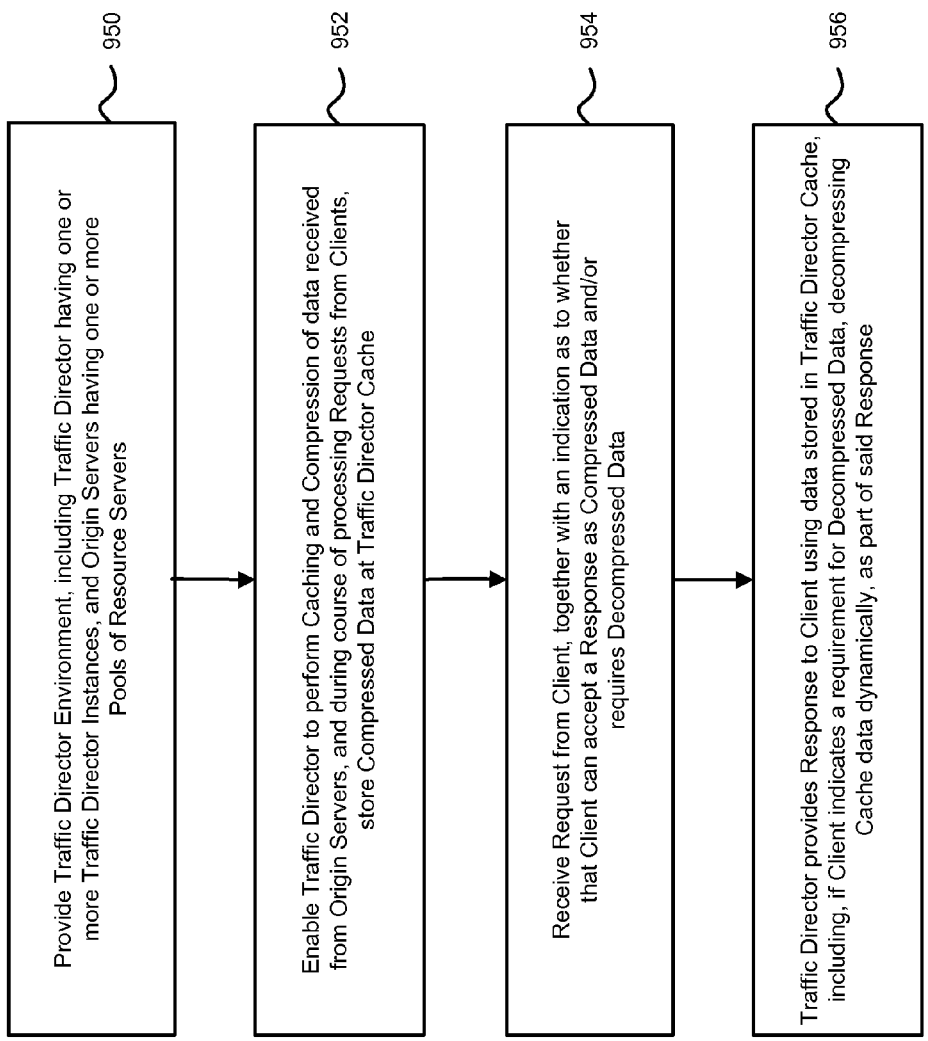
FIG. 6 is a flowchart of a method for providing dynamic HTTP decompression in a traffic director environment, in accordance with an embodiment.

FIG. 6 is a flowchart of a method for providing dynamic HTTP decompression in a traffic director environment, in accordance with an embodiment. As shown in FIG. 6, at step 950, a traffic director environment is provided, including a traffic director having one or more traffic director instances, and origin servers having one or more pools of resource servers. At step 952, the traffic director is enabled to perform caching and compression of content or data received from the origin servers, and during the course of processing requests from clients, store one or more compressed data at the traffic director's cache. At step 954, the traffic director can receive a request from a client, for a particular content or data, together with an indication as to whether that client can accept a response as compressed data and/or requires decompressed data. At step 956, if the requested content is in the cache, the traffic director can provide a response to the client using the data stored in the cache, including, if the client indicates a requirement for decompressed data, then decompressing the cache's data dynamically, as part of preparing the response.

Support for Hardware-Assisted Compression Primitives

In accordance with an embodiment, the traffic director can be configured to make use of hardware-assisted compression primitives, for example Intel's Integrated Performance Primitives (IPP), to further improve the performance of its data compression and decompression, including the HTTP caching and dynamic decompression features described above.

In accordance with an embodiment, a computer hardware, such as a processor, can be associated with a compression/decompression library, which in turn can be used to improve the performance of compression and decompression operations on certain processors. For example, some computer hardware manufactures provide a zlib library for use with their product (e.g., Intel provide its IPP library, which can be preloaded into the system during startup. In accordance with an embodiment, if a compression/decompression library is made available, the traffic director can make use of the library to improve performance of its compression and decompression operations.

Figure 7:
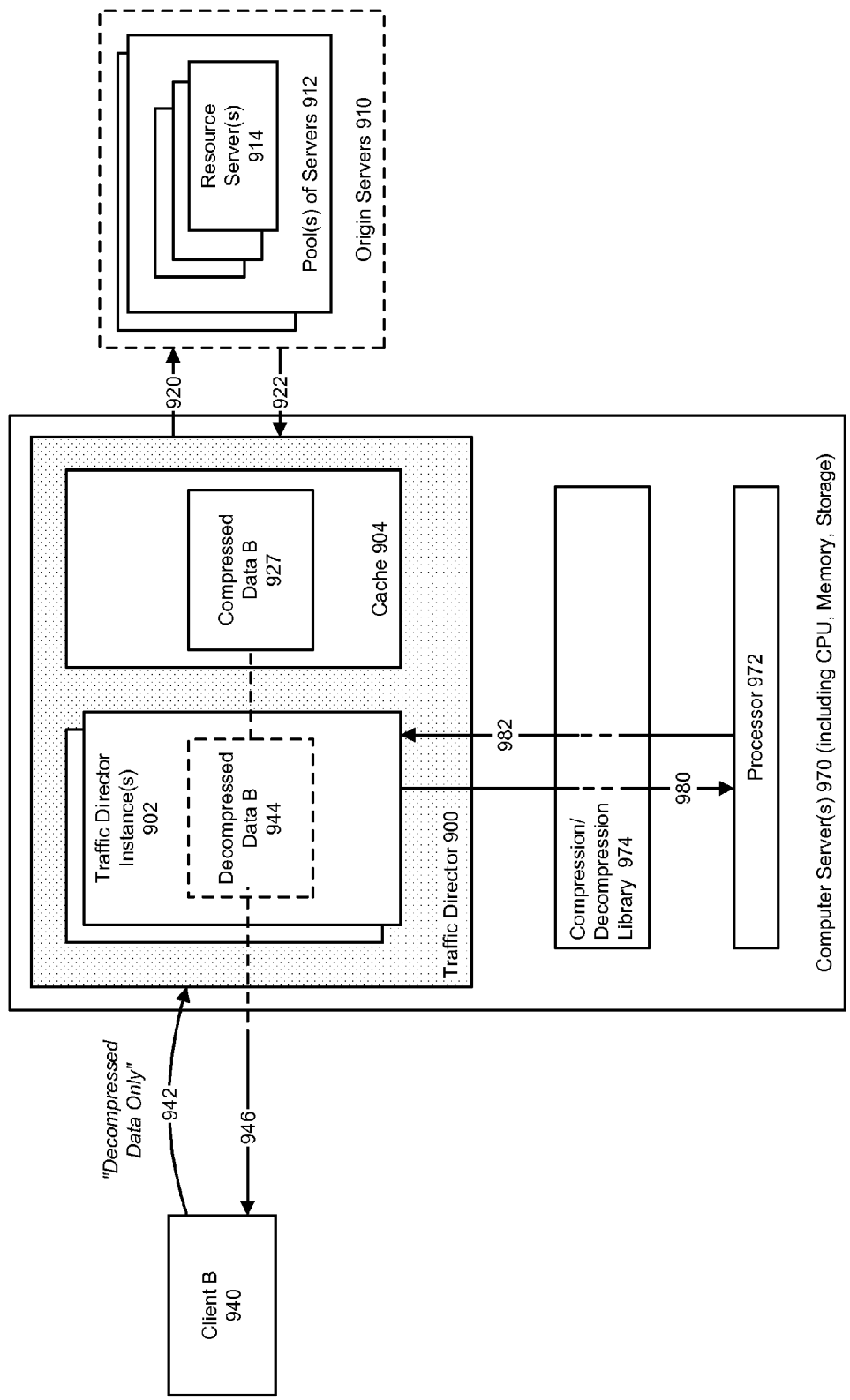
FIG. 7 illustrates support for hardware primitives, for use with dynamic HTTP decompression in a traffic director environment, in accordance with an embodiment.

FIG. 7 illustrates support for hardware primitives, for use with dynamic HTTP decompression in a traffic director environment, in accordance with an embodiment. As shown in FIG. 7, in accordance with an embodiment, the traffic director can be provided on a computer server 970 that includes a processor 972. In accordance with an embodiment, the system comprises a compression/decompression library 974 (e.g., a zlib library). When the traffic director needs to compress or decompress content or data, for example in decompressing cache data in response to a client, it can utilize 980, 982 the compression/decompression library, to take advantage of hardware-assisted compression primitives provided by the processor.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system which provides data decompression in a traffic director environment, comprising:
    a traffic director, executing on one or more microprocessors, wherein the traffic director includes a plurality of traffic director instances that use a single virtual IP address for receipt of requests from a client, wherein the traffic director is configured to communicate the requests from the client to origin servers having one or more pools of resource servers; and
    a cache in the traffic director, wherein the cache is enabled for use with one or more of the origin servers, for caching data corresponding to origin server content, wherein the traffic director compresses the data prior to caching the data;
    wherein the traffic director is configured to make use of hardware-assisted compression primitives provided by the one or more microprocessors to improve performance of the data compression and decompression, and operates to
        receive from the client a request that includes a header indicating whether the client accepts compressed data or non-compressed data, and
        provide cached data in a format to the client based on the indication from the client.

2. The system of claim 1, wherein when the client requires non-compressed data, the traffic director communicates the request to an origin server to obtain a response, or if the traffic director determines that a copy of the data is currently stored within its cache, in a compressed format, decompresses that data and returns a decompressed variant of the data to the client.

3. The system of claim 1, wherein a particular origin server is configured to serve image files and other content to the client, and the traffic director is configured to cache a selection of the files received from that origin server in response to requests, within its cache, for a particular period of time.

4. The system of claim 1, wherein the system includes a compression/decompression library, which in turn is used to improve the performance of compression and decompression operations on certain processors.

5. The system of claim 1, wherein the plurality of traffic director instances are configured to communicate with one another using a heartbeat.

6. The system of claim 1, wherein the traffic director operates to recognize whether the client accepts data in a compressed or decompressed format by default.

7. The system of claim 1, wherein the traffic director includes a plurality of caches, wherein each of the plurality of caches is enabled for one of the plurality of traffic director instances for caching data corresponding to an origin server.

8. The system of claim 1, wherein the traffic director utilizes a compression/decompression library to make use of the hardware-assisted compression primitives provided by the one or more microprocessors.

9. A method for providing data decompression in a traffic director environment, comprising:
    providing a traffic director executing on one or more microprocessors, wherein the traffic director includes a plurality of traffic director instances that use a single virtual IP address for receipt of requests from a client, wherein the traffic director is configured to communicate the requests from the client to origin servers having one or more pools of resource servers;
    providing a cache, which is enabled for use with one or more of the origin servers, for caching data corresponding to origin server content, wherein the traffic director compresses the data, prior to caching the data, wherein the traffic director is configured to make use of hardware-assisted compression primitives provided by the one or more microprocessors to improve performance of the data compression and decompression;
    receiving, at the traffic director, a request from the client, wherein the request includes a header indicating whether the client accepts compressed data or non-compressed data; and
    providing cached data in a format to the client based on the indication from the client.

10. The method of claim 9, wherein when the client requires non-compressed data, the traffic director communicates the request to an origin server to obtain a response, or if the traffic director determines that a copy of the data is currently stored within its cache, in a compressed format, decompresses that data and returns a decompressed variant of the data to the client.

11. The method of claim 9, wherein a particular origin server is configured to serve image files and other content to the client, and the traffic director is configured to cache a selection of the files received from that origin server in response to requests, within its cache, for a particular period of time.

12. The method of claim 9, further comprising providing a compression/decompression library, which in turn is used to improve the performance of compression and decompression operations on certain processors.

13. The method of claim 9, wherein the plurality of traffic director instances are configured to communicate with one another using a heartbeat.

14. The method of claim 9, wherein the traffic director operates to recognize whether the client accepts data in a compressed or decompressed format by default.

15. The method of claim 9, wherein the traffic director includes a plurality of caches, wherein each of the plurality of caches is enabled for one of the plurality of traffic director instances for caching data corresponding to an origin server.

16. The method of claim 9, wherein the traffic director utilizes a compression/decompression library to make use of the hardware-assisted compression primitives provided by the one or more microprocessors.

17. A non-transitory computer readable storage medium, including instructions stored thereon which when read and executed by one or more computers cause the one or more computers to perform the steps comprising:
configuring a traffic director executing on one or more microprocessors, wherein the traffic director includes a plurality of traffic director instances to use a single virtual IP address for receipt of requests from a client, wherein the traffic director is configured to communicate the requests from the client to origin servers having one or more pools of resource servers;
providing a cache, which is enabled for use with one or more of the origin servers, for caching data corresponding to origin server content, wherein the traffic director compresses the data, prior to caching the data, wherein the traffic director is configured to make use of hardware-assisted compression primitives provided by the one or more microprocessors to improve performance of the data compression and decompression;
receiving, at the traffic director, a request from the client, wherein the request includes a header indicating whether the client accepts compressed data or non-compressed data; and
providing cached data in a format to the client based on the indication from the client.

18. The non-transitory computer readable storage medium of claim 17, wherein when the client requires non-compressed data, the traffic director communicates the request to an origin server to obtain a response, or if the traffic director determines that a copy of the data is currently stored within its cache, in a compressed format, decompresses that data and returns a decompressed variant of the data to the client.

19. The non-transitory computer readable storage medium of claim 17, wherein a particular origin server is configured to serve image files and other content to the client, and the traffic director is configured to cache a selection of the files received from that origin server in response to requests, within its cache, for a particular period of time.

20. The non-transitory computer readable storage medium of claim 17, further comprising providing a compression/decompression library, which in turn is used to improve the performance of compression and decompression operations on certain processors.

21. The non-transitory computer readable storage medium of claim 17, wherein the traffic director operates to recognize whether the client accepts data in a compressed or decompressed format by default.

22. The non-transitory computer readable storage medium of claim 17, wherein the traffic director includes a plurality of caches, wherein each of the plurality of caches is enabled for one of the plurality of traffic director instances for caching data corresponding to an origin server.

* * * * *

UNITED STATES PATENT AND TRADEMARK OFFICE
CERTIFICATE OF CORRECTION

| | |
|---|---|
| PATENT NO. | : 9,652,293 B2 |
| APPLICATION NO. | : 13/625716 |
| DATED | : May 16, 2017 |
| INVENTOR(S) | : Kukreja |

It is certified that error appears in the above-identified patent and that said Letters Patent is hereby corrected as shown below:

In the Drawings

On sheet 3 of 7, in FIGURE 3, under Reference Numeral 224, Line 1, delete "Instrusion" and insert -- Intrusion --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*